United States Patent [19]
Catte

[11] Patent Number: 5,847,373
[45] Date of Patent: Dec. 8, 1998

[54] APPARATUS FOR TRANSFERRING INFORMATION BETWEEN A PORTABLE OBJECT AND A READER

[75] Inventor: Etienne Catte, Port-Marly, France

[73] Assignee: Schlumberger Industries, Montrouge, France

[21] Appl. No.: 823,147

[22] Filed: Mar. 25, 1997

[30] Foreign Application Priority Data

Mar. 26, 1996 [FR] France .................................. 96 03714

[51] Int. Cl.$^6$ ............................ G06K 19/06; G07D 7/00
[52] U.S. Cl. ........................ 235/492; 235/493; 235/462; 235/377; 340/825.34
[58] Field of Search .................................. 235/492, 493, 235/382, 487, 462; 340/825.34, 825.31

[56] References Cited

U.S. PATENT DOCUMENTS

| | | | |
|---|---|---|---|
| 3,793,600 | 2/1974 | Grosbard | 235/61.12 |
| 3,852,572 | 12/1974 | Nicoud | 235/61.12 |
| 4,494,127 | 1/1985 | King | 235/377 |
| 4,634,850 | 1/1987 | Pierce et al. | 235/487 |
| 4,849,615 | 7/1989 | Mollet | 235/380 |
| 4,882,473 | 11/1989 | Bergeron et al. | 235/380 |
| 5,109,153 | 4/1992 | Johnsen et al. | 235/468 |
| 5,350,907 | 9/1994 | Sjoblom | 235/380 |
| 5,408,078 | 4/1995 | Campo et al. | 235/380 |
| 5,541,583 | 7/1996 | Mandelbaum | 340/825.34 |
| 5,670,772 | 9/1997 | Goto | 235/493 |

FOREIGN PATENT DOCUMENTS

| 0 426 163 A1 | 5/1991 | European Pat. Off. . |
|---|---|---|
| WO 88/04458 | 6/1988 | WIPO . |

OTHER PUBLICATIONS

Patent Abstracts of Japan, vol. 96, No. 002 & JP–A–08 055205 (Tokin Corp.), 27 Feb. 1996.
Patent Abstracts of Japan, vol. 010, No. 132 (P–456), 16 May 1996 & JP–A–60–254371 (Anritsu Denki KK), 16 Dec. 1985.

*Primary Examiner*—Anita Pellman Gross
*Assistant Examiner*—Daniel St.Cyr
*Attorney, Agent, or Firm*—Frishauf, Holtz, Goodman, Langer & Chick, P.C.

[57] ABSTRACT

Apparatus for electronically transferring information between an electronic component and a reader. The electronic component is disposed on a substrate of a portable object, which substrate also carries a first antenna connected to the component. The reader includes a second antenna. The electronic information transfer is performed by inductive coupling between the first and second antennas, without electrical contact between the component and the reader. The reader includes a marker device suitable for writing a mark on the substrate in the event of the portable object being placed in the immediate proximity of the reader, and after information transfer is effected.

7 Claims, 2 Drawing Sheets

APPARATUS FOR TRANSFERRING INFORMATION BETWEEN A PORTABLE OBJECT AND A READER

FIELD OF THE INVENTION

The present invention relates to apparatus for transferring information between a portable object and a reader.

A particularly advantageous application of the invention lies in the field of transport, in which case said portable object is a single ticket or a return ticket (also known as a "one-way" ticket or a "round-trip" ticket). Another field of application of the invention is that of controlling access, in which case the portable object is a badge giving access on a single occasion only to certain premises.

BACKGROUND OF THE INVENTION

From the state of the art, and in particular in the field of transport, apparatuses are known (often referred to as "contactless cards") enabling information to be transferred electronically between an electronic component situated on the substrate of an ISO format card which constitutes the portable object and a reader installed in a payment terminal located on the path for gaining access to the transport means under consideration.

The electronic component of the card is connected to a first antenna configured on the substrate, while the reader includes a second antenna in such a manner that when the card comes close to the reader in the terminal, inductive coupling is established between the first and second antennas, thereby enabling information to be transferred electronically, without there being any electrical contact between the component and the reader.

Information relating, for example, to the number of trips still available on a given route is stored in a non-volatile memory of the component and is capable of being changed by the reader when the card is presented in the vicinity of the terminal.

Naturally, information must be capable of being transferred without requiring special handling over ranges of the order of 10 cm, with the various components of such contactless apparatuses, i.e. essentially the two antennas thereof, being dimensioned accordingly, thus making them relatively expensive. That is why that type of technology is presently used only for multi-use cards, such as season-ticket cards which are valid until some fixed date, e.g. for a period of one month.

If consideration is now given not to making cards that are valid for a determined duration regardless of the use made of them, but of tickets that are valid for one trip or for two trips only, there arises the problem of enabling the user to tell which tickets in a set of tickets held by the user at any given moment have already been used and are therefore unsuitable for further use, and which tickets have not yet been used, with this difficulty stemming from the fact that tickets of this type are generally sold in booklets, e.g. of ten tickets.

SUMMARY OF THE INVENTION

One object of the invention is to make it possible, particularly when the portable objects constitute travel tickets of limited validity, to distinguish unused tickets from tickets that have already been used.

This and other objects of the invention are attained in accordance with one aspect of the invention which includes a reader having marking means suitable for making a mark on the substrate of a portable object when it is placed in the immediate proximity of the reader.

Thus, the portable object is marked when it is presented for the first time at a close distance (less than a few millimeters) to the reader, with the advantage for the user of being protected by the portable object itself from any harmful effects of the marking means which, as explained in greater detail below, may be constituted, for example, by a laser beam, an ultraviolet flash lamp, or indeed a jet of ink, an infrared system, and more generally any system for producing physical marking. The mark written in this way tells the user that the portable object, e.g. a single (i.e. one-way) ticket has already been presented to a reader. The proximity of the portable object relative to the reader also presents the advantage of enabling marking to be performed cleanly.

Preferably, in order to ensure that the marking is indeed associated with a transfer that has genuinely taken place, e.g. an electronic transaction, provision is made for said reader to include control means for controlling said marking means and suitable for triggering marking of the substrate of the portable object when information has been transferred electronically.

Since implementation of the apparatus of the invention requires the portable object to be brought close to the reader, the inductive coupling between the first and second antennas is very great, and in particular it is much greater than that which occurs in present apparatuses that do not require the portable object to be held in the hand, and this makes it possible to envisage reducing the performance of the components used in the apparatus of the invention. Thus, in the invention, said first antenna coupled to the electronic component has a low Q-factor so that information can be transferred electronically only when the portable object is in the immediate vicinity of the reader.

Since the antenna represents a major portion of the cost of the portable object, this achieves a considerable reduction in cost, e.g. by using antennas that are merely silkscreen printed on a substrate. The cost of an antenna of this type is related to the density of silver or copper in the ink used, and is thus directly related to the cost of the ink.

In order to monitor effectively whether it is possible to transfer information under good conditions, the invention provides for said electronic component of the portable object to include means for measuring the level of the signal in said first antenna and means for comparing said level with a reference value stored in a non-volatile memory of the component, with electronic information transfer being allowed only if the measured level is not less than said reference value.

DETAILED DESCRIPTION OF THE INVENTION

Figure 1:
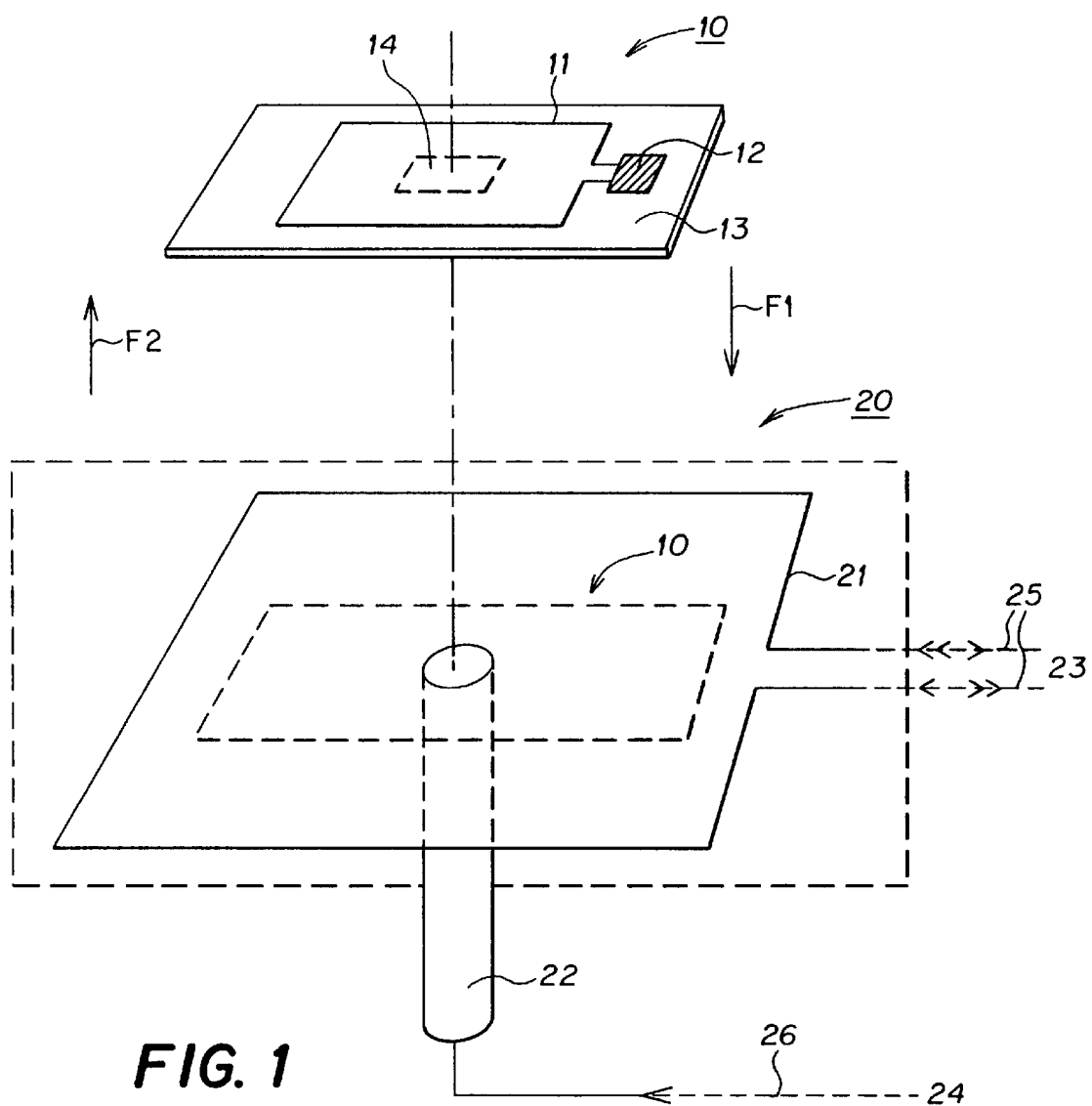
FIG. 1 is an exploded perspective view of electronic information transfer apparatus of the invention.

FIG. 1 is a diagram of apparatus for electronically transferring information between a reader 20 and an electronic component 12 of a portable object 10. As mentioned above, said portable object 10 may be a travel ticket of restricted use or a badge giving access on a single occasion only. The reader 20 is generally incorporated in a fixed terminal for payment or identification purposes. The structure of reader 20 is represented schematically in FIG. 1 by a box outlined by a broken line.

By way of example, the electronic component 12 may be a semiconductor chip of the type normally used in what is widely known as smart card technology, and includes at least one non-volatile memory in which information is stored for transmission to or from the reader 20. The component 12 is located on the substrate 13 of the portable object 10, which may be made out of plastics material, or better out of cardboard since that is cheaper. The component 12 can be integrated on the substrate 13 in various different ways, in particular the component can be inserted in a cavity formed in the substrate in the same manner as ISO electronic memory cards, which are now in widespread usage.

FIG. 1 shows that the substrate 13 also carries a first antenna 11 connected to the component 12. Advantageously, the antenna 11 is silkscreen printed on the substrate 13 or it is made by metallization, e.g. by depositing aluminum on Mylar (registered trademark). These techniques are much cheaper than those used for obtaining antennas having a high Q-factor and which require conductors of low resistivity and of large diameter or large thickness.

The reader 20 includes a second antenna 21 shown in FIG. 1 as being rectangular, but which could equally well be constituted by a circular loop, with information being transferred electronically by inductive coupling between the first and second antennas 11 and 21 when the portable object 10 is brought very close to the reader 20 into the position shown in dashed lines, by being moved in a direction substantially parallel to the arrow F1. Antenna 21 can be made in the same way as antenna 11.

As shown in FIG. 1, the reader 20 has a central region of the second antenna 21 which includes marker means 22 suitable for writing a mark in a zone 14 of the substrate 13 when, specifically, the portable object 10 is placed in the immediate proximity of the reader 20 in the position shown by dashed lines in FIG. 1. In this way, two operations are performed in the same approach movement of the portable object 10, namely sufficient inductive coupling is established between the two antennas 11 and 21, and the substrate is marked so as to enable the user to identify which portable objects have already been used.

In a first embodiment, said marker means 22 is constituted by a laser suitable for writing said mark on the substrate 13 of the portable object 10 directly in the zone 14 of the substrate itself. So as to reduce the amount of energy required for the laser, it is advantageous for the marking zone 14 to be heat sensitive, e.g. by having a heat sensitive ink or resin deposited therein. As well as reducing energy consumption and the cost of the laser, reducing the energy it emits also serves to eliminate any risk for the user. The advantage of using a laser is that it makes it possible to write a mark in the form of alphanumeric characters.

In a second embodiment, said marker means is a flash lamp suitable for writing said mark in a zone 14 of the substrate 13 on which a photosensitive ink has been deposited. Under such circumstances, the written mark appears in the form of a zone of color that is different from that of the remainder of the substrate, but there is no possibility of writing alphanumeric characters.

Finally, in a third embodiment, said marking means is constituted by the second antenna 21 itself which is suitable for writing said mark while the portable object 10 of the reader 20 is being moved away along arrow F2 of FIG. 1, by demagnetizing a magnetosensitive material such as a ferrofluid which is deposited for this purpose on the substrate 13. When the portable object 10 leaves the field of the antenna 21, the ferrofluid is demagnetized and its visual appearance changes. It suffices for the remanent field recorded in the magnetic substrate to be less than the peak-field produced by the antenna 21 at a distance equal to the distance that allows electronic information transfer to take place.

Figure 2:
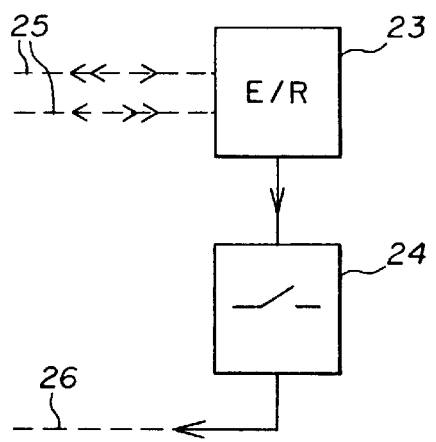
FIG. 2 is a block diagram showing control means for controlling the marking means of the apparatus of FIG. 1.

As shown in FIGS. 1 and 2, the second antenna 21 is connected by lines 25 to a processor unit 23 suitable for receiving information transmitted from the electronic component 12, for processing said information, and for responding by returning to the component 12 the information as processed in this way.

It will be observed in FIG. 2 that means 24 are provided for controlling the marking means 22 via line 26 so that on arrival of a signal from the processor unit 23, a mark is written on the substrate 13 of the portable object 10 in the event of information being transferred. In this way, it is certain that marking cannot occur unless information transfer has indeed taken place. Means 24 can be an electronic switch controlled by unit 23, such as, for example, an FET transistor, the gate of which is coupled to unit 23 to switch the conductivity of the transistor.

Figure 3:
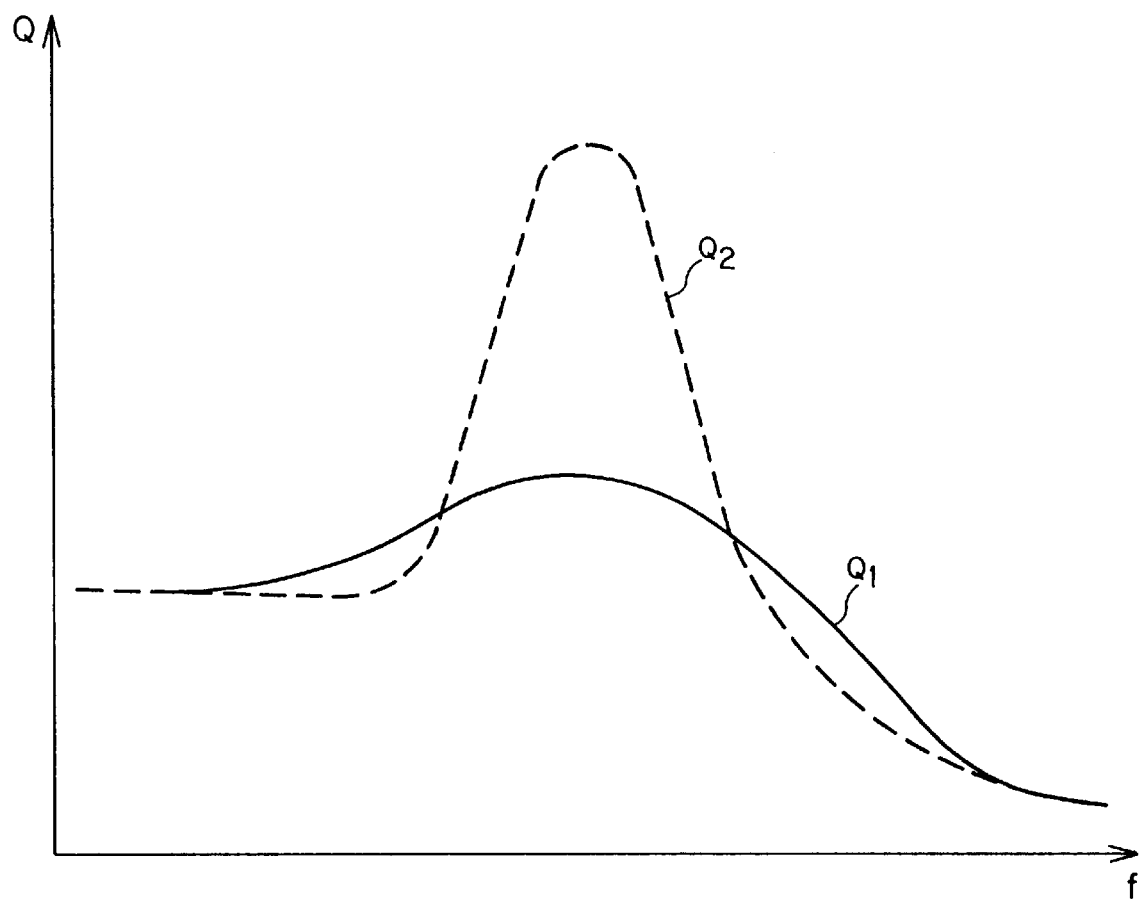
FIG. 3 is a graph showing the degraded Q-factor Q1 of the antenna of the portable object shown in FIG. 1 as a function of frequency f, in comparison with the Q-factor Q2 of an antenna for a portable object that provides inductive coupling over a large range.

As mentioned above, the first antenna 11 coupled to the electronic component 12 may have a degraded Q-factor Q1 that enables information to be transferred electronically only when the portable object 10 is in the immediate proximity of the reader 20. Under such circumstances, the poor performance of the antenna 11 is compensated by the high degree of inductive coupling between the two antennas 11 and 21 due to the very small distance between them. The term "degraded" is used to indicate a Q-factor that is lower than the Q-factor Q2 that the antenna 11 would need to have for an application in which the portable object 10 is not brought to within less than a few centimeters from the reader 20. FIG. 3 is a graph showing the Q-factors Q1 and Q2 as a function of frequency.

In order to ensure that information can be transferred under satisfactory conditions in spite of the degraded performance of the first antenna 11, the electronic component 12 of the portable object 10 includes means for measuring the signal level in the antenna 11. The means for measuring can be a peak-detector or a rectifier followed by an integrator. The level as measured in this way is then applied to comparator means for comparison with a reference value representing the minimum signal level that must be reached in the antenna 11 to enable transfer to take place. Providing the level as measured is not less than said reference value, transfer is authorized; otherwise, transfer is prevented.

The reference level can be established, for example, by means of a voltage source. Once the level has been exceeded, even if only fleetingly, electronic transfer is triggered. Marking takes place either while transfer is occurring, or after it has occurred.

Although preferred embodiments of the invention have been described in detail above, various modifications thereto will be readily apparent to anyone with ordinary skill in the art. Such modifications are intended to fall within the scope of the present invention as defined by the following claims.

I claim:

1. Apparatus for electronically transferring information between an electronic component disposed on a substrate of a portable object, which substrate also carries a first antenna connected to said component, and a reader including a second antenna, said electronic information transfer being performed by inductive coupling between said first and second antennas without electrical contact between the component and the reader, wherein said reader comprises:

marker means suitable for writing a mark on said substrate when the portable object is placed in the immediate proximity of the reader, and control means responsive to a signal coming from a processor unit connected to the second antenna to cause said marker means to trigger writing of said mark on the substrate of the portable object in the event of electronic information transfer taking place.

2. Apparatus according to claim 1, wherein said marker means comprises a laser suitable for writing said mark on the substrate of the portable object.

3. Apparatus according to claim 1, wherein said marker means comprises a laser suitable for writing said mark on a thermosensitive zone of the substrate of the portable object.

4. Apparatus according to claim 1, wherein said marker means comprises a flash lamp suitable for writing said mark on a photosensitive zone of the substrate of the portable object.

5. Apparatus according to claim 1, wherein said marker means comprises said second antenna which is suitable for writing said mark by demagnetizing a magnetosensitive material deposited on said substrate while the portable object is being moved away from the reader.

6. Apparatus according to claim 1, wherein said first antenna coupled to the electronic component has a minimal Q-factor that allows electronic information transfer to take place only in the event of the portable object being in the immediate proximity of the reader.

7. Apparatus according to claim 6, wherein said electronic component of the portable object includes means for measuring the signal level in said first antenna, and means for comparing said level with a reference value, electronic information transfer being made possible only in the event of the measured level being not less than said reference value.

* * * * *